July 12, 1949.  H. E. MULLER, JR  2,476,211
ROLL GROOVING APPARATUS
Filed April 22, 1947   3 Sheets-Sheet 1

Inventor
Herman E. Muller Jr.
By Donald G. Dalton
His Attorney

July 12, 1949.　　　　H. E. MULLER, JR　　　　2,476,211
ROLL GROOVING APPARATUS

Filed April 22, 1947　　　　　　　　　　3 Sheets-Sheet 2

Inventor
Herman E. Muller Jr.
By Donald G. Dalton
His Attorney

July 12, 1949.　　　H. E. MULLER, JR　　　2,476,211
ROLL GROOVING APPARATUS

Filed April 22, 1947　　　　　　　　　3 Sheets-Sheet 3

Inventor
Herman E. Muller Jr.
By Donald G. Dalton
His Attorney

Patented July 12, 1949

2,476,211

UNITED STATES PATENT OFFICE 2,476,211

ROLL GROOVING APPARATUS

Herman E. Muller, Jr., Youngstown, Ohio, assignor to Carnegie-Illinois Steel Corporation, a corporation of New Jersey Application April 22, 1947, Serial No. 743,101

9 Claims. (Cl. 90—20)

This invention relates to an apparatus for cutting grooves in a surface of a workpiece, and more particularly it relates to apparatus for cutting spiral grooves in the peripheral surfaces of solids of revolutions, for example, rolling mill rolls.

The invention has among its objects the provision of a novel apparatus for spirally grooving the surface of a workpiece, such apparatus being characterized by its simplicity of construction and operation.

The invention has as a further object the provision of apparatus for spirally grooving the peripheral surface of a solid of revolution wherein adjacent grooves may be spaced any desired amount, such spacing being entirely independent of the helix lead of the cutter.

These and other objects of the invention will be more fully apparent in the following description of a preferred embodiment of the apparatus of the invention. Although such apparatus described and illustrated is adapted for the spiral grooving of peripheral grooved rolling mill rolls, it is to be understood that the invention may be used to advantage in the grooving of workpieces other than solids of revolution, and further that when it is employed in the grooving of solids of revolution such as rolling mill rolls, such rolls need not be peripherally grooved.

In the rolling of spirally ribbed rods and bars, such as concrete reinforcing bars of a type generally similar to those disclosed in the patent to Mueser, No. 815,619, it is necessary that at least the final set of rolls be spirally grooved so as to present a roll pass having a shape complementary to that desired in the rod or bar. Such mill rolls are thus grooved circumferentially, such circumferential grooves in turn having spiral grooves formed therein, the spiral grooves lying on a helix whose axis is perpendicular to the axis of each roll. The spiral grooves, which must be formed quite accurately to insure their matching on the mating rolls of the roll pass, have hitherto been difficult and expensive to form. The apparatus most frequently used for grooving such rolls prior to the invention makes use of hobs or continuous spiral generating systems in which the spacing between adjacent grooves has necessarily been a function of the spiral lead of the cutter, the spacing between grooves being equal to or a whole number multiple of the helix lead. It is frequently desired that such groove spacing be altered for different applications of the bar, but this has required the adoption of a different helix lead which is not necessarily that which gives the reinforcing bar its optimum strength and the best possible interlocking with the concrete. Then, too, such hobs and the tools employed in continuous spiral generating systems have been quite expensive, making it necessary for the outlay of a considerable amount of money whenever rolls with a different groove spacing, and thus a different spiral lead, must be prepared.

The apparatus of the present invention is simple in character and quite inexpensive to build. Its salient feature is that the spacing between adjacent grooves in rolls grooved thereby is entirely independent of the spiral lead of the cutter. Thus, with a given spiral lead, any desired groove spacing may be chosen. When grooves with a different spiral lead are desired, it is necessary only to provide another relatively simple tool having the desired helical lead and another feeding cam with the proper contour to feed the tool at the rate required by its helix lead.

Briefly, the apparatus of the invention provides means for positioning the workpiece, a tool having a shank with at least one tooth projecting therefrom in a plane substantially radial of the shank, means for feeding the workpiece and the tool relatively to each other so that the workpiece travels relatively toward and away from the axis of the tool shank, means to rotate the tool about the axis of its shank, means to feed the tool in the direction of its axis at a predetermined rate during engagement of the tooth with the workpiece, and means to retract the tool axially to its starting position during that portion of its rotation when the tooth is free from contact with the workpiece. In a preferred embodiment, the tool is provided with a plurality of teeth projecting from the tool shank in planes substantially radial thereof, the teeth being located upon a helix of the desired lead. The teeth lie within an included angle materially less than 180°, the remainder of the tool shank being gapped, that is, free from teeth. The feeding movement of the tool along the axis of the tool shank is effected by a feeding cam operating in timed relationship with rotation of the tool shank, such cam giving the tool an axial feed which is slightly greater than that which would be given by the helically cutting teeth alone. In such manner the contour of the groove, particularly its lead, is very accurately controlled.

The invention will be more readily understood by reference to the accompanying drawings in which.

Figure 4:
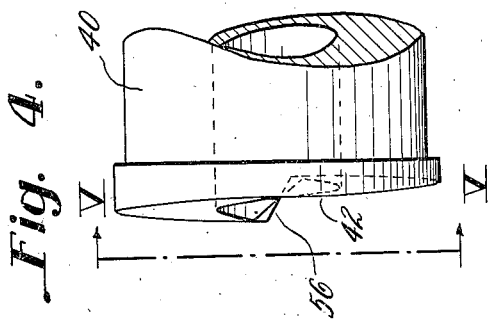
Figure 4 is a view in side elevation of the tool feed controlling cam.

In the drawings, reference character 2 denotes a rolling mill roll provided with the peripheral groove 4. The apparatus of the invention provides such roll with further spaced helical grooves 6 within the peripheral groove 4, one such groove 6 being shown in Figures 1 and 2.

Figure 3:
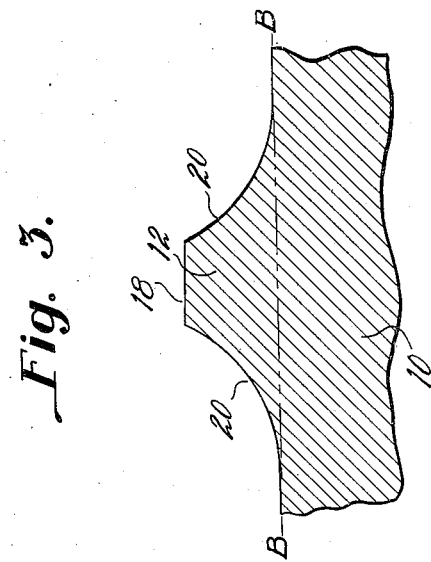
Figure 3 is a view in section through a portion of the tool, the section being taken along the line III—III in Figure 2.

The cutting tool, generally designated by the reference character 8, is of an elongated shape having shank 16, a central toothed portion 10, and a pilot end 14. The teeth 12 on portion 10 are three in number in the embodiment shown, such teeth being positioned on a helix of angle C with respect to the axis of the shank. The teeth have the shape shown in Figures 2 and 3, and are provided with the side and end relief customary in planing and milling tools, and have a straight flat forward cutting edge 18 and arcuate side cutting edges 20 so that when the workpiece, in this instance the peripheral grooved roll 2, and the tool 8 are fed toward each other so that when the bottom gapped portion of the cutter (Figure 2) substantially contacts the ungrooved surface of peripheral groove 4 the spiral groove 6 has the same shape as that portion of tooth 12 shown above the line B—B in Figure 3.

Figure 1:
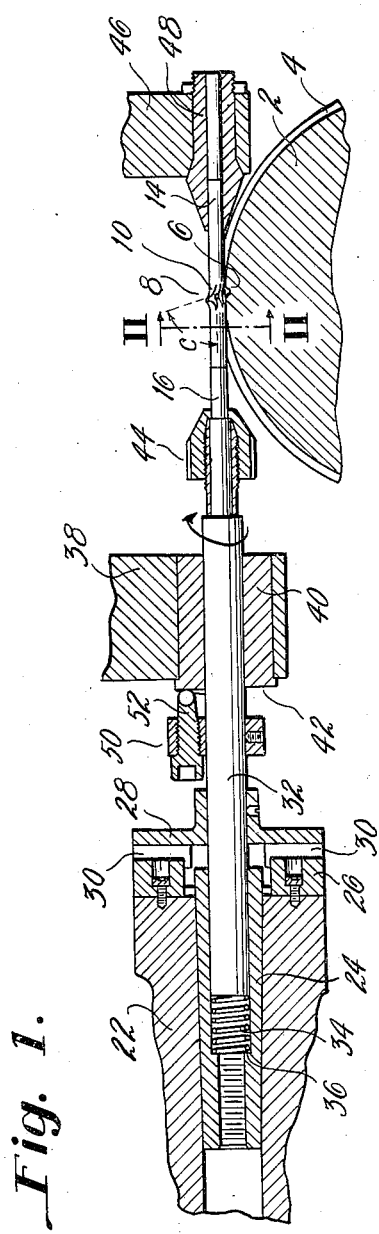
Figure 1 is a view partly in vertical section and partly in side elevation of a portion of the apparatus in the vicinity of the tool and workpiece.

Conveniently the apparatus of the invention is attached to a milling machine of which the rotatable headstock 22 is shown in Figure 1. Such headstock, which has a tapered axial opening therein, is provided with a correspondingly tapered sleeve 24 receiving the inner end of arbor 32. The headstock 22 drives the arbor through the medium of the slotted face plate 26 on the outer end of the headstock, with which is engaged the driver 28 affixed to the arbor, projections 30 on the rear face of the driver fitting into the slots on the face plate. The inner end of sleeve 24 is provided with a shoulder 36, between which end the inner end of the arbor 32 is positioned the helical spring 34, which functions constantly to thrust the arbor toward the right in Figure 1.

Figure 6:
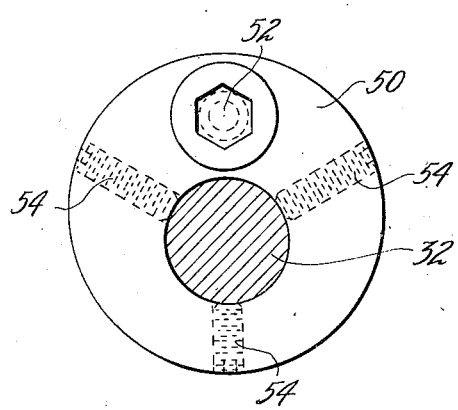
Figure 6 is a view in end elevation of the cam follower.
Figure 7:
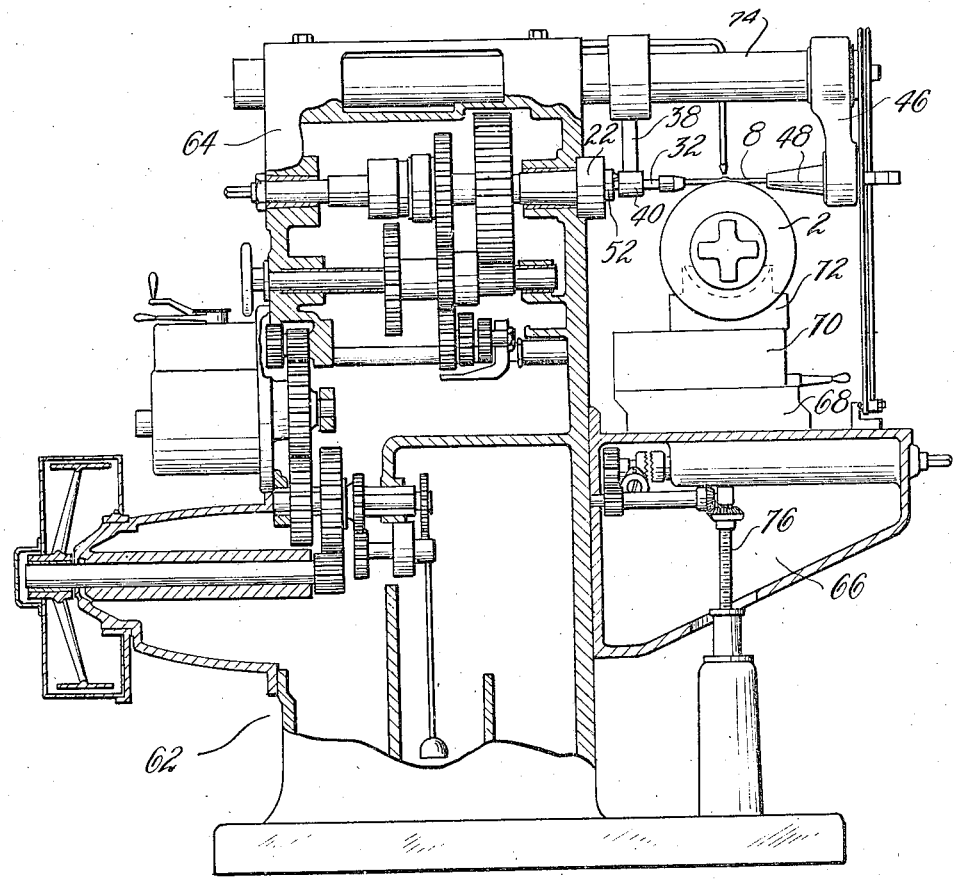
Figure 7 is a view partly in vertical section of a milling machine with the apparatus shown in Figures 1 to 6, inclusive incorporated therein.

The arbor is further supported in the steady-rest 38 supported from the overarm 74 of the milling machine, as shown in Figure 7. The steady-rest is provided with a bushing 40, the left hand outer end 42 of which is a helically faced cam having the configuration more clearly shown in Figures 4 and 5. The forward end of arbor 32 is provided with a chuck 44 for engagement with the tool shank 16. Support of tool 8 is completed by the outboard support 46, which depends from the overarm 74, as shown in Figure 7, and which is provided with a guide sleeve 48 for receiving the pilot 14 of the tool. The spacing of the chuck 44 from the roll 2 is such as to leave the tool free to reciprocate along its axis. The preferred apparatus employs the cam 42 to give the tool its axial feed relative to the workpiece. To accomplish this purpose, a cam follower 50 is affixed to the arbor 32 by set screws 54, as more clearly shown in Figure 6. Such cam follower is provided with an adjustable ball-tipped cam following stud 52 positioned normal to the surface of the cam. The angular positions of cam 42, cam follower 50, and tool 8 are adjusted and affixed so that the axial feed given arbor 32 by the cam and cam follower is in the same direction as, but slightly exceeds, that which would be given them by the teeth on the cutter acting alone. In this manner positive control of the axial feed of the cutter is provided irrespective of the degree of contact between the tool and the workpiece.

Figure 5:
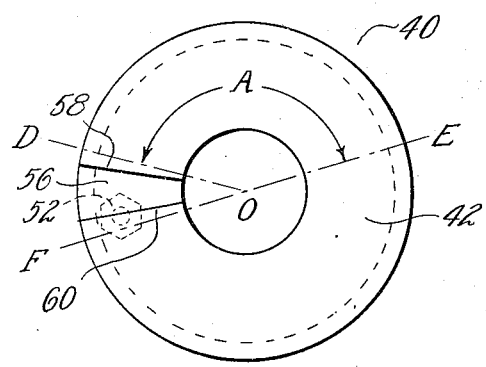
Figure 5 is a view in front elevation of such cam, the view being that along line V—V.

As can be seen by a consideration of Figures 4 and 5, cam 42 is provided with a sharply inclined return slope 56 bounded between elements 58 and 60 of the cam face. From element 60 the surface of the cam rises as one travels around the cam in a counterclockwise direction (Figure 5) until element 58 is reached. When cam following stud 52 is in the position shown in dotted lines in Figure 5, it is just beginning to draw arbor 32, rotating in the direction of the curved arrow in Figure 1, to the left in that figure. Travel of the arbor to the left continues until stud 52 reaches element 58 of the cam, at which point the stud travels down the return slope 56, allowing the arbor and the tool to move to the right under the action of spring 34.

Figure 2:
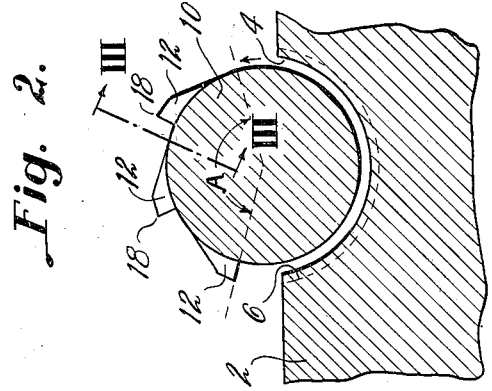
Figure 2 is a view in vertical section taken through the tool and the workpiece, the section being taken along the line II—II in Figure 1.

The cam follower and tool are set up so that they have the relationship to each other shown in Figures 2 and 5. That is, when the tool shown in Figure 2 has the illustrated relationship with respect to the workpiece, in this instance a peripherally grooved roll, the cam and cam follower have the relationship shown in Figure 5. Thus cam follower 52 travels some distance up the inclined face of the cam to the line OF, for instance, before the leading tooth 12 engages the roll. Such leading tooth remains in engagement with the roll throughout at least substantially 180° rotation of the tool, that is, until cam following stud 52 reaches the line OE. The remainder of the teeth on the tool, however, remain in engagement with the roll throughout an additional angle A which is somewhat less than 180°, in the embodiment shown such angle A being 150°. Such angle A is the angle within which the teeth on the tool are included as shown in Figure 2. After rotation of the tool through such additional angle A, the teeth will have fully cleared the roll, leaving the gapped portion of the cutter confronting it. At this time follower 52 will have reached line OD on the cam. Since the cutting tool is then free of the roll, when the cam follower reaches the return slope 56 on the cam the tool and arbor are free to return to the right (Figure 1) to resume their initial cutting position.

As stated the apparatus of the invention is conveniently used in conjunction with a milling machine. A typical installation is that shown in Figure 7, wherein the milling machine is shown generally as 62, such machine having a column 64 within which is located the usual arbor drive mechanism. The machine is further provided with vertically adjusted pedestal 66, transversely adjustable saddle 68 thereon, and a longitudinally adjustable table 70 on the saddle. The table is provided with a work support 72 holding roll 2 in such manner that the roll may be indexed at desired angular intervals and may be locked in position between indexing steps. The roll is, of course, locked during the machining of each groove. The relative feed of cutter 8 and roll 2 to allow the tool to cut the spiral groove 6 increasingly deeper upon each engagement of the teeth with the roll is effected by means between the pedestal and the adjusting screw 76 of the milling machine. Screw 76 may be manually adjusted, if desired, but it is preferred that it be connected in the manner conventional in milling machines so as to give the pedestal an intermittent vertical feed at a predetermined rate. After one spiral groove in the workpiece, such as a roll, has been cut in the manner described to the desired depth, pedestal screw 76 is reversed to lower the roll from engagement with the tool. Thereupon the indexing mechanism for the roll 2 is unlocked and the roll indexed the desired angular amount as determined by the groove spacing. The roll is again locked as to angular position, and the pedestal screw 76 driven to raise the roll again into contact with the tool, following which a new helical groove is cut as before.

For purposes of illustration I have disclosed a preferred embodiment of the roll grooving apparatus of the invention. It is to be understood, however, that the apparatus is capable of considerable variation within the teaching of the invention. The invention is therefore to be defined within the scope of the following claims.

I claim:

1. Apparatus for spirally grooving the surface of a workpiece which comprises means for positioning the workpiece, a tool having a shank and at least one tooth projecting therefrom in a substantially radial plane, all the teeth on the shank lying within an included angle of less than 180° between radial planes through the axis of the tool shank, means to support the tool with the axis of its shank and its tooth contiguous to the surface of the workpiece to be grooved, said supporting means being so constructed and arranged as to rotate the tool about the axis of its shank, means to feed the workpiece and the tool relatively to each other so that the workpiece moves toward and away from the axis of the tool shank, means for feeding the tool relative to the workpiece in a direction along the axis of the tool shank when the tooth of the tool engages the workpiece, thereby to cut a helical groove in the latter, and means to retract the tool along the axis of its shank relative to the workpiece in a direction opposite the direction of the feed last above mentioned when the tooth of the tool is free from contact with the workpiece.

2. Apparatus for spirally grooving the surface of a workpiece which comprises means for positioning the workpiece, a tool having an elongated shank and having a series of teeth projecting therefrom in substantially radial planes, the teeth lying in a helix along the shank and also lying within an included angle of less than 180° between radial planes through the axis of the tool shank, means to support and rotate the tool about the axis of the shank and with the shank and the teeth contiguous to the surface of the workpiece to be grooved, means to feed the workpiece and the tool relatively to each other so that the workpiece moves toward and away from the axis of the tool shank, means for feeding the tool relative to the workpiece along the axis of the tool shank when the teeth of the tool engage the workpiece, such last named means being so constructed and arranged as to cooperate with the tool rotating means to cause the teeth to describe a helix when in engagement with the workpiece, such helix having a pitch slightly greater than the pitch of the teeth of the tool, and means to cause a return movement of the tool relative to the workpiece when the teeth of the tool are free from the workpiece.

3. Apparatus for spirally grooving the surface of a workpiece which comprises means for positioning the workpiece, a tool having an elongated shank and having a series of teeth projecting therefrom in substantially radial planes, the teeth lying in a helix along the shank and also lying within an included angle of less than 180° between radial planes through the axis of the tool shank, means including a rotatably driven headstock and an arbor rotatably driven thereby and longitudinally reciprocable with respect thereto to support and rotate the tool about the axis of the shank and with the shank and the teeth contiguous to the surface of the workpiece to be grooved, means to feed the workpiece and the tool relatively to each other so that the workpiece moves toward and away from the axis of the tool shank, means including a cam and cam follower coacting with the arbor for feeding the tool relative to the workpiece along the axis of the tool shank when the teeth of the tool engage the workpiece, such last named means being so constructed and arranged as to cooperate with the tool rotating means to cause the teeth to describe a helix when in engagement with the workpiece, such helix having a pitch slightly greater than the pitch of the teeth of the tool, and means to cause a return movement of the tool relative to the workpiece when the teeth of the tool are free from the workpiece.

4. Apparatus for spirally grooving the surface of a workpiece which comprises means for positioning the workpiece, a tool having an elongated shank and having a series of teeth projecting therefrom in substantially radial planes, the teeth lying in a helix along the shank and also lying within an included angle of less than 180° between radial planes through the axis of the tool shank, means including a rotatably driven headstock and an arbor rotatably driven thereby and longitudinally reciprocable with respect thereto to support and rotate the tool about the axis of the shank and with the shank and the teeth contiguous to the surface of the workpiece to be grooved, means to feed the workpiece and the tool relatively to each other so that the workpiece moves toward and away from the axis of the tool shank, means including a cam and cam follower coacting with the arbor for feeding the tool relative to the workpiece along the axis of the tool shank when the teeth of the tool engage the workpiece, such last named means being so constructed and arranged as to cooperate with the tool rotating means to cause the teeth to describe a helix when in engagement with the workpiece, such helix having a pitch slightly greater than the pitch of the teeth of the tool, and means to cause a return movement of the tool relative to the workpiece when the teeth of the tool are free from the workpiece, such means comprising a relieved portion on the cam and means thrusting the arbor to retract the tool from the workpiece when the cam follower reaches such relieved portion.

5. Apparatus for spirally grooving the surface of a roll which comprises means for positioning the roll for indexing about its axis, means for locking the roll in position between indexing movements, a tool having an elongated shank and having a series of teeth projecting therefrom in substantially radial planes, the teeth lying in a helix along the shank and also lying within an included angle of less than 180° between radial planes through the axis of the tool shank, means to support and rotate the tool with the axis of its shank lying in a plane transverse to the axis of the roll and with the axis of the shank and the teeth thereof positioned contiguous to the surface of the roll to be grooved, means to feed the roll and the tool relatively to each other so that the roll moves toward and away from the axis of the tool shank, means to feed the tool relative to the roll in a direction along the axis of the tool shank when the teeth of the tool engage the roll, such last named means being so constructed and arranged as to cooperate with the tool rotating means to cause the teeth to describe a helix when in engagement with the roll, such helix having a pitch slightly greater than the pitch of the teeth, and means to cause a return movement of the tool relative to the roll when the teeth of the tool are free from the roll.

6. Apparatus for spirally grooving the surface of a roll which comprises means for positioning the roll for indexing about its axis, means for locking the roll in position between indexing movements, a tool having an elongated shank and having a series of teeth projecting therefrom in substantially radial planes, the teeth lying in a helix along the shank and also lying within an included angle of less than 180° between radial planes through the axis of the tool shank, means to support and rotate the tool with the axis of its shank lying in a plane transverse to the axis of the roll and with the axis of the shank and the teeth thereof positioned contiguous to the surface of the roll to be grooved, means to feed the roll and the tool relatively to each other so that the roll moves toward and away from the axis of the tool shank, means including a cam and cam follower cooperating with the tool supporting and rotating means to feed the tool relative to the roll in a direction along the axis of the tool shank when the teeth of the tool engage the roll, such last named means being so constructed and arranged as to cooperate with the tool rotating means to cause the teeth to describe a helix when in engagement with the roll, such helix having a pitch slightly greater than the pitch of the teeth, and means to cause a return movement of the tool relative to the roll when the teeth of the tool are free from the roll.

7. Apparatus for spirally grooving the surface of a roll which comprises means for positioning the roll for indexing about its axis, means for locking the roll in position between indexing movements, a tool having an elongated shank and having a series of teeth projecting therefrom in substantially radial planes, the teeth lying in a helix along the shank and also lying within an included angle of less than 180° between radial planes through the axis of the tool shank, means including a rotatably driven headstock and an arbor rotatably driven thereby and longitudinally reciprocable with respect thereto to support and rotate the tool with the axis of its shank lying in a plane transverse to the axis of the roll and with the axis of the shank and the teeth thereof positioned contiguous to the surface of the roll to be grooved, means to feed the roll and the tool relatively to each other so that the roll moves toward and away from the axis of the tool shank, means including a cam and cam follower coacting with the arbor to feed the tool relative to the roll in a direction along the axis of the tool shank when the teeth of the tool engage the roll, such last named means being so constructed and arranged as to cooperate with the tool rotating means to cause the teeth to describe a helix when in engagement with the roll, such helix having a pitch slightly greater than the pitch of the teeth of the tool, and means to cause a return movement of the tool relative to the roll when the teeth of the tool are free from the roll.

8. Apparatus for spirally grooving the surface within a peripheral groove on a roll which comprises means for holding the roll for indexing about its axis, means for locking the roll from rotation between indexing movements, a tool having an elongated shank and a series of teeth projecting therefrom, each tooth lying in substantially a radial plane, the teeth lying in a helix along the shank of the tool and all lying within an included angle of less than 180° between radial planes through the axis of the shank, means to support and rotate the tool about the axis of its shank and with the shank and its teeth contiguous to the surface within the peripheral groove in the roll, the axis of the tool lying in a plane through the center of the peripheral groove and at right angles to the axis of the roll, means to feed the roll and the tool relative to each other so that the roll moves toward and away from the axis of the tool shank, means to feed the tool relative to the workpiece along the axis of the tool when the teeth thereof engage the roll, such last named means being so constructed and arranged that it feeds the tool when the teeth thereof are in engagement with the roll in a helical path having a pitch slightly exceeding the pitch of the teeth of the tool, and means to cause a return movement of the tool relative to the roll when the teeth of the tool are free from the roll.

9. Apparatus for spirally grooving the surface within a peripheral groove on a roll which comprises means for holding the roll for indexing about its axis, means for locking the roll from rotation between indexing movements, a tool having an elongated shank and a series of teeth projecting therefrom, each tooth lying in substantially a radial plane, the teeth lying in a helix along the shank of the tool and all lying within an included angle of less than 180° between radial planes through the axis of the shank, means including a rotatably driven headstock and an arbor rotatably driven thereby and longitudinally reciprocable with respect thereto to support and rotate the tool about the axis of its shank, and with the axis of the shank and its teeth contiguous to the surface within the peripheral groove in the roll, the axis of the tool lying in a plane through the center of the peripheral groove and at right angles to the axis of the roll, means to feed the roll and the tool relative to each other so that the roll moves toward and away from the axis of the tool shank, means to feed the tool relative to the workpiece along the axis of the tool when the teeth thereof engage the roll, such means comprising a fixed cam and a rotatable cam follower cooperating therewith, the cam follower being mounted on the arbor supporting the tool, resilient means thrusting the cam follower constantly into engagement with the cam, the cam having a feeding portion and a quick retracting portion, the feeding portion being of such configuration and being so related angularly to the tool that it feeds the tool along the axis of its shank when the teeth thereof are in engagement with the roll in a helical path having a pitch slightly exceeding the pitch of the teeth of the tool, the retracting portion of the cam and the cam follower being so related to each other that the cam follower reaches such retracting portion when the teeth of the tool are free from the roll whereby the resilient means return the arbor and the tool to their initial position.

HERMAN E. MULLER, JR.

REFERENCES CITED

The following references are of record in the file of this patent:

UNITED STATES PATENTS

| Number | Name | Date |
|---|---|---|
| 894,508 | Le Blond et al. | July 28, 1908 |
| 2,374,255 | Davenport | Apr. 24, 1945 |
| 2,416,518 | Fields et al. | Feb. 25, 1947 |
| 2,428,301 | Surerus | Sept. 30, 1947 |